(12) United States Patent
Sullivan et al.

(10) Patent No.: US 10,104,454 B2
(45) Date of Patent: Oct. 16, 2018

(54) PARKING DATA AGGREGATION AND DISTRIBUTION

(71) Applicant: Parkifi, Inc., Denver, CO (US)

(72) Inventors: Ryan Sullivan, Denver, CO (US); Rishi Malik, Morrison, CO (US)

( * ) Notice: Subject to any disclaimer, the term of this patent is extended or adjusted under 35 U.S.C. 154(b) by 0 days.

(21) Appl. No.: 15/286,429

(22) Filed: Oct. 5, 2016

(65) Prior Publication Data
US 2017/0098374 A1   Apr. 6, 2017

Related U.S. Application Data

(60) Provisional application No. 62/237,350, filed on Oct. 5, 2015.

(51) Int. Cl.
| | |
|---|---|
| *B60Q 1/48* | (2006.01) |
| *H04Q 9/00* | (2006.01) |
| *G06F 17/00* | (2006.01) |
| *G06F 17/18* | (2006.01) |
| *G06F 3/00* | (2006.01) |
| *G08G 1/01* | (2006.01) |
| *G08G 1/042* | (2006.01) |
| *G08G 1/14* | (2006.01) |

(Continued)

(52) U.S. Cl.
CPC ............... *H04Q 9/00* (2013.01); *G06F 3/002* (2013.01); *G06F 17/00* (2013.01); *G06F 17/18* (2013.01); *G08G 1/0116* (2013.01); *G08G 1/0129* (2013.01); *G08G 1/042* (2013.01); *G08G 1/142* (2013.01); *G08G 1/144* (2013.01); *H04L 67/00* (2013.01); *H04W 4/02* (2013.01); *H04Q 2209/43* (2013.01); *H04Q 2209/826* (2013.01)

(58) Field of Classification Search
None
See application file for complete search history.

(56) References Cited

U.S. PATENT DOCUMENTS

| | | | |
|---|---|---|---|
| 8,102,799 B2* | 1/2012 | Alexander | .......... H04L 12/2816 370/255 |
| 8,816,879 B2* | 8/2014 | Stefik | ....................... G08G 1/14 340/425.5 |

(Continued)

*Primary Examiner* — Adolf Dsouza
(74) *Attorney, Agent, or Firm* — Kilpatrick Townsend & Stockton, LLP

(57) ABSTRACT

A system of parking data aggregation and distribution may comprise a plurality of parking sensors, at least one of the plurality of parking sensors located proximate a parking area and one or more gateway devices. The system may further comprise an administrator interface, a parking operator dashboard interface, and a cloud service component. The cloud service component receives parking sensor data indicating occupancy and turnover from the gateway devices and transmits the parking sensor data to the parking operator dashboard web interface. The cloud service component may comprise a database for storing the parking sensor data and a software application for implementing an algorithm to create one or more predictions for future occupancy and future turnover during a future time period. The parking operator dashboard interface may display one or more representations of the parking sensor data over the past time period and predictions for future occupancy and future turnover.

20 Claims, 14 Drawing Sheets

(51) Int. Cl.
*H04W 4/02* (2018.01)
*H04L 29/08* (2006.01)

(56) References Cited

U.S. PATENT DOCUMENTS

2007/0050240 A1\* 3/2007 Belani ................ G06Q 30/0284
                                                                                       705/13
2016/0292808 A1\* 10/2016 Blandin ................. G06Q 50/30
2017/0092130 A1\* 3/2017 Bostick .................. G08G 1/143

\* cited by examiner

Highlander

△ 2  🚩 1  ☁ 1

43% Occupied    Current Pricing: $12/hr

| Spot ▲ | Occupancy | Turnover | Categories | Current Stay | Avg. Stay | Violation? |
|---|---|---|---|---|---|---|
| 26 | Occupied | 0 | | 5 hours | | |
| 27 | Inactive | | | | | |
| 28 | Occupied | 0 | | 4 days | 4 days | |
| 29 | Empty | 1 | | | | |
| 30 | Occupied | 0 | | 5 days | | |
| 31 | Occupied | 0 | | 9 days | | |
| 32 | Empty | 1 | | | a day | |
| 33 | Occupied | 0 | | 10 days | | |
| 34 | Empty | 0 | | | | |
| 35 | Empty | 1 | | | 5 days | |
| 36 | Occupied | 0 | | 5 hours | | |
| 37 | Occupied | 0 | | 5 hours | | Yes |
| 38 | Occupied | 0 | | 5 hours | | Yes |
| 39 | Occupied | 0 | | 9 days | | |
| 40 | Empty | 0 | | | | |
| 41 | Empty | 1 | | | a day | |
| 42 | Empty | 1 | | | 2 days | |
| 43 | Empty | 0 | | | | |
| 44 | Empty | 1 | | | a day | |

FIG. 12

| Spot | Occupancy | Turnover | Current Stay | Avg. Stay | Violation? |
|---|---|---|---|---|---|
| 50 | Empty | 2 | 3 hours | a few seconds | Yes |
| 49 | Empty | 2 | 3 hours | a few seconds | Yes |
| 48 | Occupied | 1 | 2 hours | 45 years | |
| 47 | Empty | 1 | 3 hours | a few seconds | |
| 46 | Empty | 1 | 3 hours | a few seconds | |
| 45 | Empty | 1 | 3 hours | a few seconds | |
| 44 | Occupied | 0 | 2 hours | | |
| 43 | Occupied | 0 | 2 hours | | |
| 42 | Occupied | 0 | 2 hours | | |
| 41 | Occupied | 0 | 2 hours | | |
| 40 | Occupied | 0 | 2 hours | | |
| 39 | Empty | 0 | | | |
| 26 | Occupied | 0 | 2 hours | | |
| 37 | Occupied | 0 | 2 hours | | |
| 36 | Occupied | 0 | 2 hours | | |
| 35 | Empty | 0 | 10 hours | | |

Lot Occupancies — Highlander — 40% Occupied — Map | Grid

PARKING DATA AGGREGATION AND DISTRIBUTION

PRIORITY

This application claims priority to U.S. Provisional Application No. 62/237,350, filed Oct. 5, 2015, and entitled PARKING DATA AGGREGATION AND DISTRIBUTION, which is incorporated herein by reference.

FIELD OF THE DISCLOSURE

The present disclosure relates to systems, methods, and apparatuses for creating efficiency in parking systems. In particular, but without limitation, the present disclosure relates to capturing and delivering parking data.

BACKGROUND OF THE DISCLOSURE

In densely populated urban areas, parking lots, garages, and other similar parking structures are necessary to fit all the cars that arrive at all the businesses and residences. Often, parking is a time-consuming, frustrating, and expensive experience for consumers. Operators of these parking structures can compete for parking business through several factors, some of which are within their control, and others which are not. These factors include the location of the structure relative to desirable establishments, ease of parking, safety, and price, among other things. One of the more easily controlled factors is price, and sometimes parking operators change their pricing based on external factors, such as the time of the day or week, or the occurrence of special events such as sports games and concerts, in order to attract customers over their competitors.

For consumers, there are several sources of frustration related to parking. Sometimes consumers are not able to find a parking spot, even in a paid garage, which causes them to waste time and fuel. Some studies estimate that up to 47,000 gallons of gas are wasted per month in major metropolitan areas while consumers are driving around looking for parking spots. Similar studies estimate that up to 30% of city traffic is due to consumers looking for parking. Another challenge that faces consumers is that payment acceptance mechanisms vary widely and may not suit a consumer's needs. Many parking structures require cash—and some, such as those with old parking meters, require actual coins. Some of the more antiquated systems have consumers stuff bills into a slot of a lockbox. Others have central payment kiosks, which have their own sets of problems, such as credit card reader malfunctions, confusing user interfaces, and long lines. Once a consumer has figured out how to pay for parking, an additional source of frustration is paying too much for parking itself. Signs are often confusing and hard to read, and though consumers often try to make the most practical and economical parking decision, many consumers know the annoying feeling of walking out of a parking garage in which they just parked, only to discover that just across the street was a parking structure that was closer to their intended destination and also a few dollars cheaper.

For parking operators, trying to maximize revenue has its own challenges. Once a parking structure is built, there is little that can be done to change the physical attributes of the space if challenges arise due to congestion in the area or due to problems within the structure itself. For example, if a new office building gets built next to the parking structure when there was not one before, the design of the structure may not be ideal to handle the influx of customers during certain morning hours. If the top floor of a parking structure is poorly designed to allow cars to exit, a bottleneck could be created that affects cars parking on the floor below. Changing prices to adapt to special events or weather can be a challenge as well, with most operators simply guessing what price would be best at a particular time in order to maximize revenue. Effective enforcement can also be an issue, requiring a human parking enforcement officer to consistently patrol a lot. If the method of enforcement is having an officer patrol each spot and then check to see if the spot has been paid for, there will inevitably be delay between when a car's time expires and when the parking enforcement officer discovers the payment violation. Therefore, several needs exist relating to gathering and using parking data.

SUMMARY

An aspect of the present disclosure provides a system for parking data collection and aggregation. The system may comprise a plurality of parking sensors, at least one of the plurality of parking sensors located proximate a parking area and one or more gateway devices in communication with the plurality of parking sensors. The system may further comprise an administrator interface, a parking operator dashboard interface, and a cloud service component, wherein the cloud service component receives parking sensor data indicating occupancy and turnover from the one or more gateway devices and transmits the parking sensor data to the parking operator dashboard web interface. The cloud service component itself may comprise a database for storing the parking sensor data and a software application for implementing an algorithm that compares the parking sensor data for a past time period to one or more external factors to create one or more predictions for future occupancy and future turnover during a future time period. The parking operator dashboard interface itself may displays one or more representations of the parking sensor data over the past time period and the one or more predictions for future occupancy and future turnover of the algorithm.

Another aspect of the present disclosure provides a method for providing predictive parking data. The method may comprise collecting occupancy and turnover for a plurality of parking spots and receiving information about one or more external factors from one or more application program interfaces. The method may further comprise comparing the occupancy and turnover data for a past time period to the one or more external factors to create one or more predictions for future occupancy and future turnover during a future time period and displaying the one or more predictions for future occupancy and future turnover on a graphical user interface.

BRIEF DESCRIPTION OF THE DRAWINGS

FIG. 11 shows a graphical user interface with an exemplary display of a spreadsheet with spot-level detail of parking sensor information collected through the system of the present disclosure.

FIG. 12 shows the spreadsheet of FIG. 11 sorted by a selected criteria.

DETAILED DESCRIPTION

Figure 1:
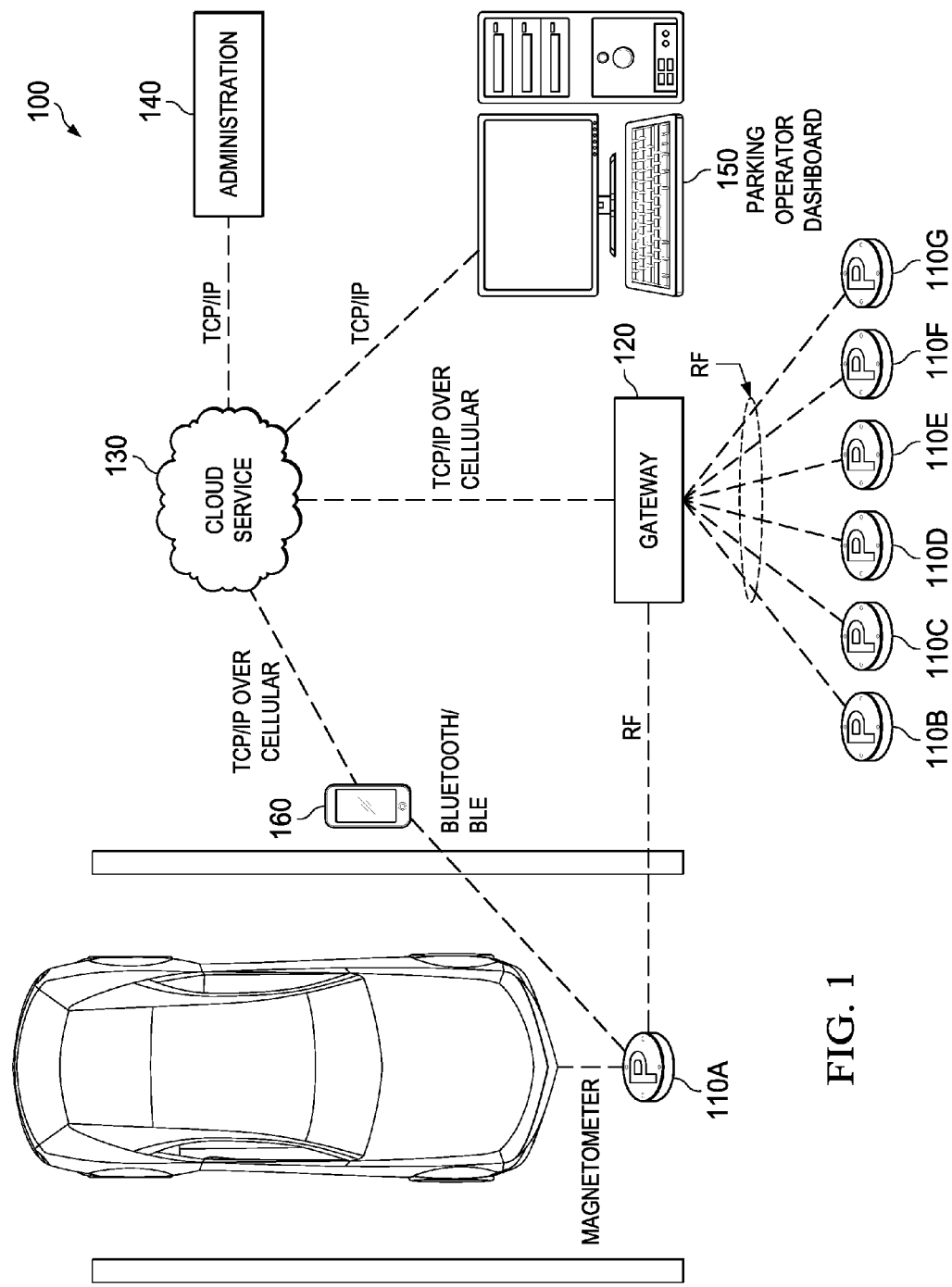
FIG. 1 shows an overview of a system for parking data aggregation and distribution in accordance with the present disclosure

One aspect of the present disclosure provides a system for collecting occupancy and turnover data for parking spots in a parking structure, creating predictions based in part thereon, and displaying such parking area information so that it can be utilized by both parking operators and consumers. The term "parking structure" or "parking area" may be used herein to describe a physical building, garage, or subterranean enclosure containing many parking spaces, but may also refer to a flat parking lot, a group of metered parking spaces on a street, or any group of parking spaces that are owned and operated by a parking operator. FIG. 1 shows a diagram of various components of a parking data collection and aggregation system 100. The parking system 100 of the present disclosure may comprise a plurality of parking sensors 100A-100G, one or more gateway devices 120, a cloud service 130, an administrator interface ("administration") 140 and a parking operator dashboard 150, each of which will be described in further detail throughout this disclosure. Optional aspects of the system 100 may include one or more consumer personal communication devices 160 with a consumer parking application. Though interactions between only one parking sensor 110A and other components of the system 100 are shown, and though only a few parking sensors 110B-110G are depicted, it is to be understood that this diagram is for illustration purposes only, and that many more parking sensors (e.g., hundreds or thousands), gateways, and/or consumer computing devices may be used in embodiments of the present disclosure.

Figure 2:
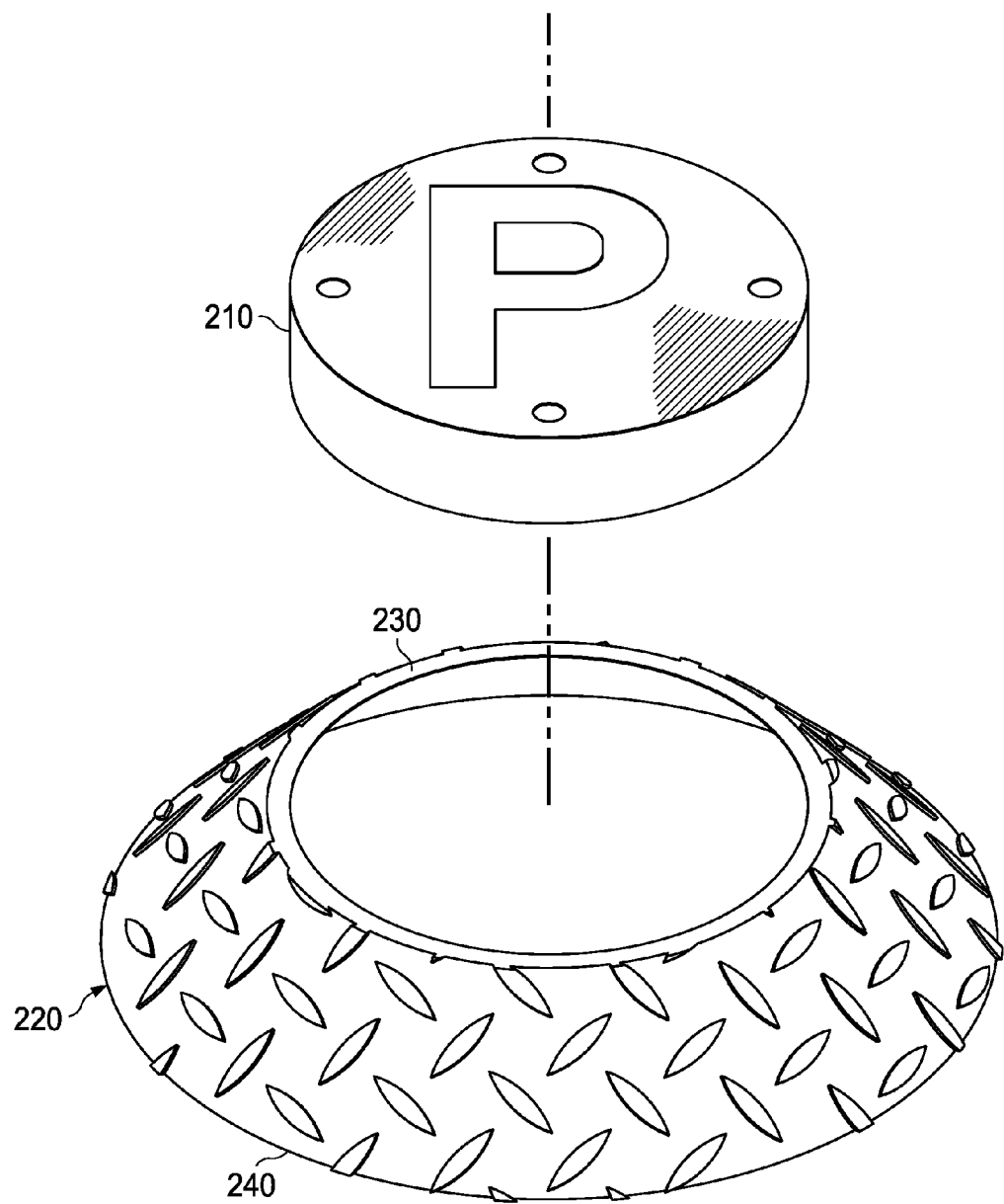
FIG. 2 shows a parking sensor and sensor mount in accordance with the present disclosure.

One component of the system 100 comprises the plurality of parking sensors 110A-110G, each of which may be located in an individual parking spot and collect data regarding vehicles that occupy the spot. In many embodiments, a parking sensor may be designed to be installed on the surface of the parking spot without being embedded into the asphalt or concrete. An advantage of installing a parking sensor above-ground is that installation costs for a parking operator may be greatly reduced as compared to installing sensors in the ground, due to the fact that no holes will have to be drilled or jackhammered into the parking lot surface. In other embodiments, parking sensors may be installed by recessing them into the ground, if desired. FIG. 2A shows an exterior view of an exemplary parking sensor 210 according to the present disclosure. As shown, the exterior housing of the sensor may be comprised of a durable material such as ABS plastic, which may be designed to withstand extreme temperatures, precipitation, and the weight of a large vehicle. It is contemplated that many other materials may be used, including other types of plastics and metals. In many embodiments, the parking sensor 200 may be cylindrical, with a diameter of approximately four inches and a height of approximately one inch. The relationship between the diameter and the height of the outer housing may contribute to the weight bearing capacity of the parking sensor.

The system may also comprise a surface mount ring 220, as shown in FIG. 2B. The surface mount ring 220 may comprise a cylindrical ring structure with an inner radius 230 and an outer radius 240. The inner radius 240 may comprise outer portion of a circular opening designed to snugly fit the outer circumference of the parking sensor. As shown, the surface mount ring 220 may be approximately the same height as the parking sensor at the inner radius 230 and slope downward toward the outer radius 240. The surface mount ring 220 may be made out of a durable plastic or other suitable material that can withstand extreme temperatures and the weight of large vehicles. An advantage of the sloped design of the surface mount ring 220 is that it may prevent pedestrians from tripping over the parking sensor itself. Additionally, it may protect the edges of the sensor from damage and wear when it is rolled over by a vehicle. The surface of the surface mount ring 220 itself may comprise ridges or patterns, and may be brightly colored, which may prevent pedestrians from slipping on the surface mount or parking sensor if either are wet.

Figure 3:
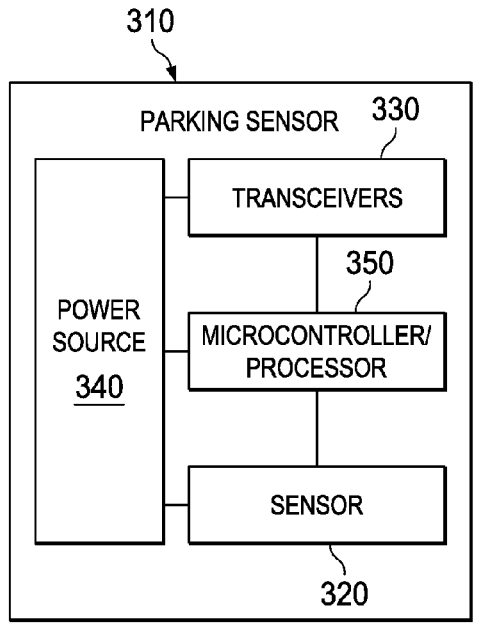
FIG. 3 shows a logical block diagram of a parking sensor of the system in accordance with the present disclosure.

The parking sensor 210 has several functions, including detecting when a vehicle occupies or leaves a spot, relaying the occupancy information to a gateway, detecting BLE-enabled devices when the spot is occupied, connecting with appropriate BLE devices, and providing information obtained through the BLE devices to the gateway. In order to carry out these functions, the parking sensor 210 may comprise a number of internal components. FIG. 3 is a logical block diagram of a parking sensor 310 in accordance with the disclosure. This logical block diagram is not to be construed as a hardware diagram, though it may be implemented in hardware or a combination of software and hardware. As shown in FIG. 3, a parking sensor 310 may comprise a sensor 320, one or more radio transceivers 330, a power source 340, a processor 350 and circuitry to connect the components. The sensor 320 may be implemented by a magnetometer in some embodiments and be used to accurately detect the presence of vehicles as they occupy and leave parking spots. An advantage of using a magnetometer over other kinds of sensors is that a high degree of detection accuracy can be achieved at a low cost. It is contemplated that in some embodiments, the sensor 320 may be implemented by other sensors, such as infrared, radar, and ultrasonic sensors in order to achieve benefits in accuracy and cost. Magnetometers are known to be able to reliably detect large pieces of metal up to several feet away, so they are useful for the specific application of detecting whether vehicles (which comprise large pieces of metal) are present in parking spots. In many embodiments, a three-axis magnetometer may be used in order to detect vehicles at various angles in relation to the sensor. A three axis magnetometer may be more accurate than a single axis magnetometer for detecting small vehicles such as motorcycles.

In general, magnetometers work by detecting the change in the earth's magnetic field by metal objects in the area of the sensor. It is known that the earth's magnetic field varies across different locations on the earth's surface. In applications of the present disclosure, where a magnetometer is used to detect the magnetic field of a vehicle, such changes in the earth's magnetic field could potentially cause malfunctions and false readings if the magnetometer were not calibrated for the particular geolocation. In order to prevent such malfunctions or false readings, the magnetometers in parking sensors of the present disclosure may be configured and/or calibrated remotely (e.g., by an administrator via a remote server) to adjust their sensitivities. As will be described later in the disclosure, the magnetometer in each parking sensor may send its raw magnetometer data to the gateway, which may in turn send that magnetometer data to the cloud service. With this raw magnetometer data, the precise magnetic field at a particular geolocation of a sensor may be measured. The cloud service may relay that information to the administrator interface, and an administrator may configure the sensitivity of each magnetometer. In some embodiments, the sensitivity of each magnetometer may be calibrated automatically by the cloud service in response to each magnetometer's measurement of its local magnetic field.

When the sensor 320 senses the presence of a vehicle, the information that the spot is occupied may be sent through a radio transceiver 330 to a network-connected gateway device (e.g., gateway 120), which in turn may relay the information to a cloud service (e.g., cloud service 130). Each of these components of the system 100 will be described in turn. The radio transceivers 330 may comprise a Wi-Fi radio, a cellular data radio, a short-range communication protocol radio such as RF 434 MHz, Bluetooth, Bluetooth Low Energy (BLE), or Zigbee, or any other type of radio transceiver suitable for sending and receiving as messages described herein. Because the sensors are designed to conserve energy in order to be low-maintenance, many embodiments will employ radio communication protocols that require low amounts of energy, such as BLE, which is a commonly-used communication protocol at the time of this disclosure. However, the present disclosure is not limited to embodiments utilizing BLE.

Referring back to FIG. 1, One aspect of the present disclosure is that each parking sensor 110A-110G may send periodic information updates to the gateway 120. Such updates may be referred to as "heartbeats," to indicate that they are sent at regular intervals, and with particular kinds of content every time. The gateway 120 may comprise a physical device with one or more radio transceivers, which has a primary purpose of receiving messages from the plurality of parking sensors within a particular geographic location, relaying the messages to the cloud service 130, and sending other messages to back to the plurality of parking sensors 110A-110G.

Figure 4:
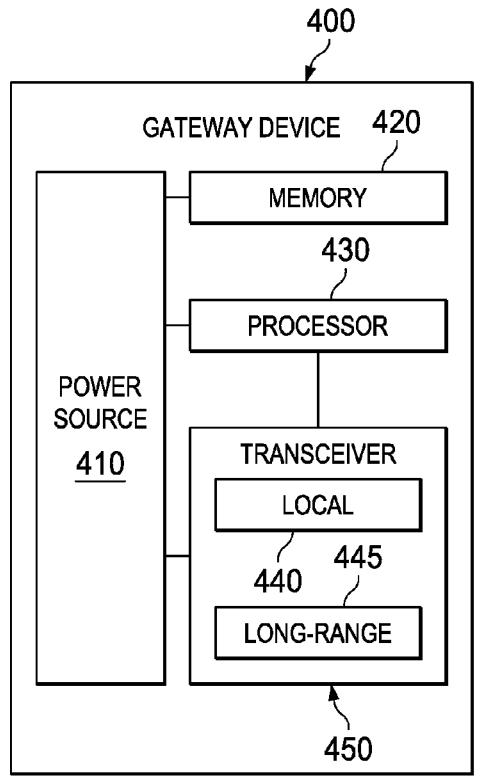
FIG. 4 shows a logical block diagram of a gateway device of the system in accordance with the present disclosure.

FIG. 4 shows a high-level logical block diagram of a gateway device 400 in accordance with the present disclosure. The gateway device 400 may comprise a power source 410, a memory 420, a processor 430, and a transceiver (e.g., radio) 450. It is contemplated that in many embodiments, the gateway device 400 may comprise more than one kind of transceiver 450, and may include both a local transceiver 440 and a long-range transceiver 445. For example, a certain type of radio communication protocol, such as a 433 MHz RF transceiver, may be well-suited for receiving the heartbeats from the parking sensors 110A-110G because the parking sensors 110A-110G are within the protocol's transmission range of the gateway 400, and because the radio protocol uses a low amount of power. Therefore, the gateway device 400 may be equipped with at least one RF 433 MHz radio as its local transceiver 440. However, the gateway 400 may be equipped with additional different radios, such as a Wi-Fi or a cellular radio as its long-range transceiver 445, in order to connect to the internet and relay information gathered from the parking sensors 110A-110G to the cloud service 130. A Wi-Fi or cellular data connection may be desirable in order to transmit large amounts of data from gateway 120 to the cloud service 130, which may be located on a remote server connected to the internet. The gateway 120 may use a Wi-Fi connection to communicate with other gateway devices in a particular parking structure having more than one gateway device. In such implementations, one of the gateway devices may be responsible for transmitting information from multiple gateway devices to the cloud service 130, or more than one of the gateway devices may be responsible for transmitting information to the cloud service 130.

In many embodiments of the system, there will usually be a large number of parking sensors in communication with any one particular gateway. As discussed previously, each parking sensor may send heartbeats with parking sensor information to the gateway. This heartbeat information may comprise a unique sensor ID, sensor status (e.g., information noting that the sensor is operational/functional) and the parking spot status (e.g., information noting that the spot is occupied or unoccupied). Each signal transmission from a parking senor to the gateway may take several seconds. The heartbeats may be sent at intervals of every few minutes (e.g., every five minutes), but these intervals may be adjusted to be longer or shorter. Because each gateway comprises a finite number of radios, and has a finite capacity to receive multiple signals at once, it is contemplated that each of the plurality of sensors may be set to send their heartbeats at intervals staggered from one another. By doing so, a single gateway device may be able to constantly receive messages from several hundred sensors or more.

In addition to the heartbeat information that is sent by the sensors every few minutes, the sensors may also periodically send "system status information," which may comprise information such as battery voltage, raw magnetometer data, the temperature of the sensor, BLE radio information, link quality measurements, and error rates. In some embodiments, this system status information may be sent along with the heartbeat, but sending all of that information in one transmission may result in a very long packet that takes a long time to transmit. The longer the transmission of each packet, the fewer sensors can communicate with the gateway device. Therefore, in some embodiments of the disclosure, system status information may be sent at separate times than the heartbeat information. The intervals between transmissions of the system status information may be longer than those between heartbeats, because the system status information may not be needed as often as heartbeat information. The staggering of the intervals and the separation of information in separate packets can maximize the amount of sensors that can communicate with a given device, and requires that the gateway device be able to support different sized packets at different intervals. In many embodiments, heartbeat information and system status information may be encrypted for security purposes using any known encryption method.

Another aspect of the communication between the parking sensors 110A-110G to the gateway device 120 is that acknowledgement (ACK) packets may be utilized to send commands from the gateway device 120 back to sensors 110A-110G. For example, each heartbeat message from a sensor (e.g., sensor 110A) to the gateway device 120 may contain the sensor ID, the sensor status information, and the parking spot information. Typically, in many communication protocols, the gateway device sends an ACK packet to acknowledge receipt of the initial message. The ACK packet would typically contain the sensor ID as well (e.g., in a header). In aspects of the present disclosure, the ACK packet may also contain, in the body of the packet, a command to the processor of the parking sensor (e.g., the microcontroller/processor 350 of FIG. 3). This command in the body would exist in addition to the acknowledgement of receipt itself that would ordinarily be contained in the body. Such a command may include a command to calibrate the magnetometer, or change a communication channel, for example.

An advantage to sending a command in an ACK packet is that the transceiver of the parking sensor does not have to be on and listening at all times in order to receive commands. In many 2-way communication protocols, a transceiver must be on at all times in order to receive messages. In embodiments of the present disclosure, the transceiver can be off most of the time, and just turn on during the times it is going to transmit information (either heartbeat information or system status information). The transceiver can remain on just long enough to receive an ACK packet in response. In this manner, effective 2-way communication can be achieved (though it may be limited to certain time intervals) via a 1-way communication protocol, all while saving significant battery life.

Again referring to FIG. 1, when a vehicle enters a spot and the magnetometer of the parking sensor 110A detects the vehicle, the BLE (or other) radio may be turned on to scan for BLE-enabled devices within the proximity of the sensor 110A. The BLE radio may be turned off at all other times in order to conserve power. The BLE radio may scan for a consumer's personal communication device, such as a smartphone 160, in order to communicate with parking applications on the smartphone 160. A number of smartphone applications for facilitating consumer parking are available, and the system of the present disclosure may be utilized with many of them. The BLE radio of parking sensor 110A may communicate the parking spot's ID number, or any other relevant information, in order to facilitate payment for the correct parking spot through the application. In other embodiments, vehicles may be equipped with BLE-enabled parking passes for pre-paid parking spots. In such embodiments, the BLE radio of the parking sensor 110A may simply verify that the BLE-enabled parking pass is authorized to park in that particular spot. In some embodiments, the status of the parking spot may be sent to the gateway device 120 at the next scheduled interval for a heartbeat message. In other embodiments, an information detection message may be sent right away, regardless of when the next scheduled heartbeat interval was to occur, in order to improve the timeliness and accuracy of the spot status information. When a vehicle leaves a parking spot, the magnetometer again detects the movement and may transmit the updates status of the spot (i.e., unoccupied) to the gateway 120, either at the next scheduled heartbeat interval or immediately through a third kind of transmission known as an "information detection" message. Upon the entering and exiting of the vehicle from a spot, the occupancy status of the spot may be correlated to payment information at the cloud service 130. By correlating the payment information to the occupancy status, the parking operator may be notified immediately through the parking operator dashboard 150 if there is a payment violation, which allows the parking operator to take immediate action.

It is contemplated that embodiments of the present disclosure may operate without a BLE radio (or other similar short-rage communication protocol) radio at all. That is, although the BLE radio may be implemented in some embodiments particularly for the purpose of allowing the parking sensor to communicate with a consumer personal communication device, this functionality is not required to implement other aspects of the disclosure. For example, the parking sensors 110A-110G, the gateway 120, the cloud service 130, and the parking operator dashboard 150 may still gather spot occupancy data and present it to a parking operator via an RF radio transceiver, Wi-Fi and/or other TCP/IP connections alone.

Figure 5:
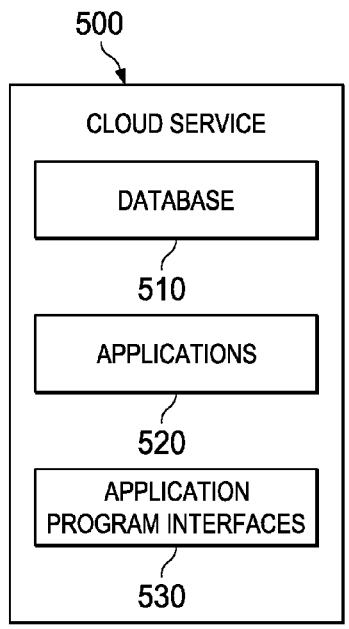
FIG. 5 shows a logical block diagram of a cloud service component of the system in accordance with the present disclosure.

As all the parking sensors 110A-110G periodically send information to the gateway 120, the gateway 120 may relay all the gathered information to the cloud service 130. FIG. 5 shows a high-level logical block diagram of the cloud service 500. The cloud service 500 may comprise one or more databases 510 for storing parking data, such as occupancy and turnover data, from parking sensors via gateways. It is contemplated that parking data may be stored for a particular period of time in order to create historical averages of the parking data. Given that each individual parking area can have hundreds or thousands of individual parking spots and sensors, and each of the sensors may send multiple parking data points each day, the number of parking data points over time can easily become voluminous, numbering into the millions, billions, or more. Therefore, it is contemplated that large commercial data centers may be implemented as the databases 510 of the cloud service 500. The could service 500 may also comprise one or more software applications 520 and one or more application program interfaces (API's) 530. The APIs will be described in more detail later in this disclosure. The applications 520 may be execute managing and organizing received data, sending and receiving commands to and from various devices within the system, and executing instructions provided through the administration interface 140, the parking operator dashboard interface 150, and through the consumer personal communication device 160, and implementing predictive algorithms. The predictive algorithms of the present disclosure will be described in more detail presently, but in general, the software applications 520 may use information received from parking sensors, information stored in the databases 510, information received from the parking operators, and information received through the APIs 530 in order to formulate predictions. It is contemplated than in many embodiments, the information sent from the gateway 120 to the cloud service 130 may be encrypted via a default setting.

As one example of the function of the cloud service 500, it may receive information from the consumer computing device 150 that includes payment information for the particular parking spot of sensor 110A, which may include the time period for which the consumer has paid. It may also receive corresponding information from the gateway 120 about whether the spot associated with sensor 110A is occupied. The cloud service 130 may compare the information received from both sources to determine if the consumer has paid for the correct amount of time. The cloud service may be able to determine, for example, if the amount of time the consumer has paid for has expired, and if the spot is still occupied. The cloud service may then send this information to the parking operator dashboard 150 to alert the operator for parking enforcement.

It is contemplated that the cloud service 130 may be a centralized cloud service that receives information from multiple gateways, which may span across multiple parking structures, cities, states, or countries. The cloud service 130 may expose one or more APIs to third-party computer application developers to allow access to information on particular parking structures. By exposing these APIs, the cloud service 130 and the aggregated data therein may be accessed for the particular needs of a mobile parking application and the consumers who use it. Therefore, the data aggregated by the system of the present disclosure may be available to consumers as well as parking operators, but in different ways. Consumers may be able to see which parking structures have available spots, how much spots cost, and parking lot rules and restrictions through their application user interfaces. In many embodiments, the applications may display spot-level maps that show exactly which parking spaces are unoccupied in real-time. In other embodiments, the APIs may provide information about multiple parking spots within the parking garage that may be displayed on signs inside or outside the parking garage. For example, a sign outside a parking garage may display a percentage of occupancy of the total garage, and signs in each level may show a map of open and occupied spots. Consumers may be able to enter a desired destination address in advance of their arrival to plan out their parking, or they may use their current location to determine where there are nearby spots. By having this information accessible, consumers may make informed decisions about where to park, and may waste less time and fuel finding parking. Consumers may also be able to pay for parking spaces while at their parking spaces, or remotely, thereby avoiding machine malfunctions, payment lines, and parking violations. Various applications that may interface with the cloud service 130 of the present disclosure may be implemented in standalone consumer communication devices such as smartphones or wearables, or may be implemented in vehicle dashboards themselves.

Figure 6:
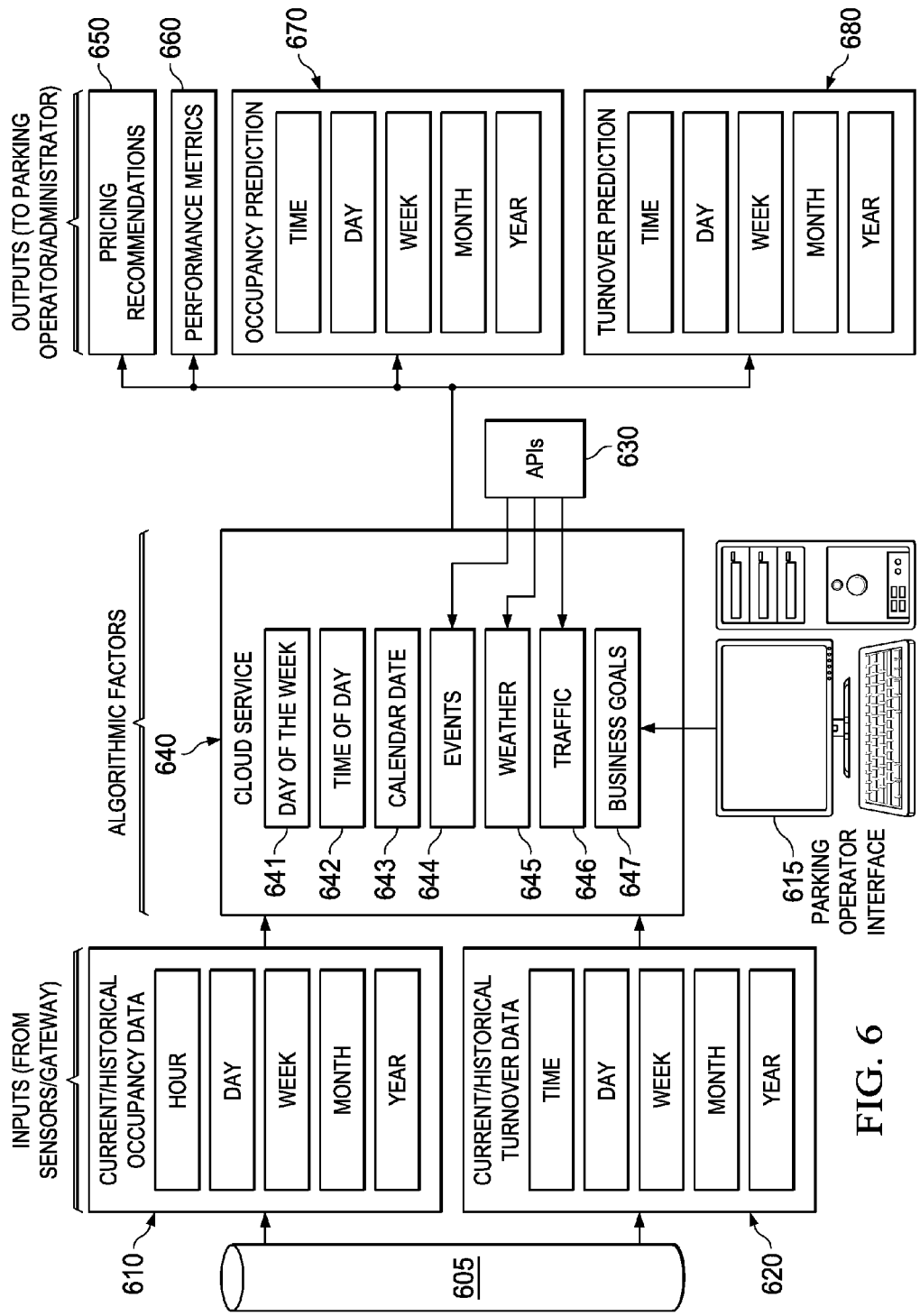
FIG. 6 shows a high-level view of inputs, algorithmic factors, and outputs of algorithms for predicting occupancy and turnover of the present disclosure.

As previously described, the cloud service 500 implements a number of functions relating to data aggregation and distribution, and uses algorithms to provide predictive information based in part on the data acquired through the system. FIG. 6 is a logical diagram of the inputs, algorithmic factors, and outputs of the algorithms of the present disclosure. As shown, the inputs can include parking data that is both current and historical, which include current/historical occupancy data 610 and current/historical turnover data 620. For the purposes of the present disclosure, "occupancy" can be defined as a measure of whether any vehicle occupies a spot, and for how long. For example, if one spot is occupied by any vehicles for 50% of the time during a particular day, the occupancy for that spot would be "50% per day." This percentage would be the same whether it was one vehicle parked in the spot for half of the day, or several vehicles who occupies the spot for a few minutes or hours at a time which added up to 50% of the time for the day. "Turnover" can be defined as a measure of how many times an individual vehicle entered and then exited a spot, and can also be measured over time. For example, if four vehicles enter and exit a spot in one particular day, the turnover can be quantified as "4 per day." Each measure may be useful to a parking operator, because revenue may be tied to both the number of individual customers as well as the time spent by each customer.

The quantity of data collected by parking sensors over time for each individual spot and parking area may be vast, with millions of data points being collected even for a single parking structure. In just a single parking spot, in the course of one day, the parking sensor for that spot can collect the following pieces of information: 1) how many times vehicles entered and exited the spot (generally correlating to how many different individual vehicles occupied the spot), 2) how long each vehicle occupied the spot, 3) what times the vehicle occupied the spot, and 4) how long a spot remained empty. This data may continuously be collected over time and used in beneficial ways. The raw data regarding occupancy and turnover may be referred to as "current" and/or "historical" data, and both may be useful to a parking operator. As will be shown later, current data may be displayed on a graphical user interface, and may be compared to historical data. When this data is collected over the course of more than one day, the cloud service can implement simple algorithms such as averaging the number of vehicles per spot, per day, and based on the average for that spot, predict the average number of vehicles in that spot on days in the future. An aspect of the present disclosure is that the data collected by the parking sensors may be used to accurately predict demand (i.e., future occupancy and turnover) for parking in a particular parking area at particular times. Hence, the current/historical occupancy data 610 and current/historical turnover data 620 is shown as measured in time (e.g., hours of the day or elapsed time), day, week, month, and year. Similarly, the output occupancy prediction 670 and turnover prediction 680 is also provided in terms of time, day, week, month, and year.

The complexity of making accurate predictions increases significantly as additional factors are added to the algorithms in the present disclosure. FIG. 6 shows that various algorithmic factors are taken into account at the cloud service 640. Each factor may influence whether the various predictions provided are increased or decreased. The following factors may be considered to increase or decrease predicted values in various embodiments:

a. Day of the week 641: Algorithms of the present disclosure may weigh days of the week either as one of two categories (weekday and weekend) or into the seven separate days. The data collected by parking sensors may be compared to the days of the week in which it is collected on the cloud service 640. This information may effect a predictive algorithm in a number of ways that may differ between different parking areas. For example, certain parking areas may be busier on weekdays than weekends, and busier on Mondays than Fridays, if they are in business districts. As another example, a performing arts center parking area may be busier on a weekend than a weekday.
  b. Time of day 642: The data collected by the parking sensors may be compared to the time of day during which it is collected on the cloud service. Predictions may factor in time periods like morning and evening rush hours, business hours, or may individually track occupancy and turnover on an hour-by-hour basis, for example.
  c. Calendar date 643: The data collected by the parking sensors may be compared to a calendar date in which it collected on the cloud service. Calendar dates may provide insight into occupancy and turnover patterns on holidays, patterns that are dependent on seasons, and can be used to compare patterns on a year-over-year or month-over-month basis.
    d. Events 644: Events such as concerts, meetings, conventions, or sporting events that are scheduled to occur within a certain geographic radius of a parking area may be provided through an external events API. Events associated with a large number of vehicles may be used to increase one or more prediction values.
    e. Weather 645: External weather service data may be provided to the cloud service through an API. Bad weather events, such as freezing temperatures, snow, rain, hail, or storms may be used to provide predictions for lower occupancy and turnover when combined with historical parking data. Similarly, good weather can be used to provide predictions for higher occupancy and turnover when combined with historical parking data.
    f. Traffic 646: Traffic data may also be provided to the cloud service through an external API. In some instances, greater traffic in certain areas may be correlated with increased occupancy and/or turnover. For example, some traffic patterns near a parking area may indicate greater demand for parking. In other instances, it may be greater traffic may be correlated with decreased occupancy and/or turnover. For example, some traffic patterns may indicate that vehicles may be blocked from entering a parking area.
    g. Business goals 647: The parking operator 615 may input certain business goals related to occupancy, turnover, pricing, revenue, citations, or any other measurable objective. The business goals may be a metric against which actual performance data is compared. The performance metrics 660 shown as an output may be based on business goals entered by the parking operator.

In addition to occupancy predictions 670, turnover predictions 680, and performance metrics 660, the algorithms of the present disclosure may also provide pricing recommendations 650. Increases in pricing (which may also be known as "surge pricing") can be suggested to the parking operator based on predictions of increased occupancy and/or turnover during a particular time period. Surge pricing may also factor in the parking operator's business goals in order to increase the likelihood that a particular goal will be hit in response to the surge pricing. It is contemplated that surge pricing recommendations may be implemented automatically in certain embodiments.

One main benefit to implementing the algorithms of the present disclosure by using large amounts of collected data from parking sensors is that predictions can become more refined and accurate over time. Take, for example, a parking area in which parking sensors and the system of the present disclosure are installed for the first time. On the first day, the parking sensors will be collecting data, but will not have previous data for the particular parking area to which it may compare current data. Therefore, the predictions the algorithms can provide may be limited in accuracy. It is contemplated that even on a "first day," the algorithms may still have default settings from which to base predictions. For example, even on a first day of collecting data, the algorithm may have weather information, event information, and traffic information. A default algorithm related the weather information could be a simple one such as: "if the weather is sunny and 72° now, and it is predicted to rain later this afternoon, the predicted occupancy and turnover compared to now will be 25% less." As another example, a default algorithm related to an event could be "if there is no event now, but there is a concert 0.5 miles away in three hours, the predicted occupancy and turnover compared to now will be 50% more."

As the system collects more actual parking data over time, though, any default assumptions of the algorithm may be programmed to change. For example, over a period of six months, actual data may show that rain in the forecast reliably predicts a 10% increase in occupancy and a 10% decrease in turnover. It may also show that snow predicted in the forecast reliably predicts a 30% increase in occupancy and turnover. It may also show that a concert 0.5 miles away reliably predicts a 70% increase in occupancy but a 50% decrease in turnover. A benefit of the system is that as more data is collected, predictions may become more refined. An aspect of the algorithms is that they may automatically adjust predictions related to each of the factors (i.e., time, day, calendar date, events, weather, traffic, and business goals). That is, the algorithms may be self-learning, without requiring additional input from a parking operator or administrator.

Figure 7:
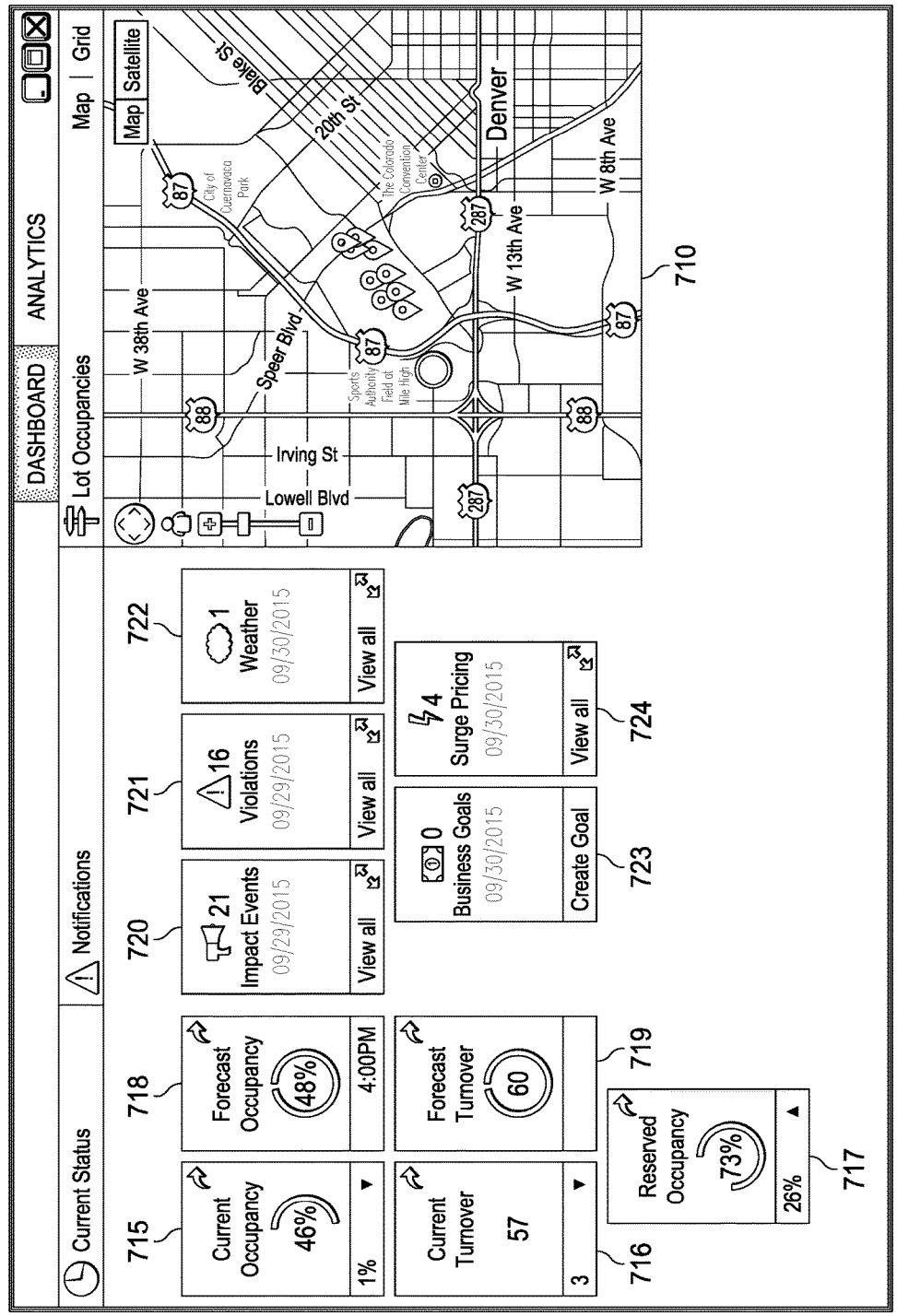
FIG. 7 shows a graphical user interface with an exemplary parking operator dashboard of the present disclosure.

Many of the outputs of the above-described algorithms, as well as other functions of the cloud service 500 may be understood through an explanation of the resulting displays on the parking operator dashboard 150 interface. An example of a dashboard screen 700 is shown in FIG. 7. The dashboard screen 700 may include a map 710 showing the location of each of the parking operator's parking structures. An aspect of the dashboard screen 700 is that the parking operator may click on each parking structure and view parking data for that particular structure individually, as will be shown in other figures. Also shown on the dashboard screen 700 are several "status information" cards 715-719 and several "notification" cards 720-724. Status information cards may include current, real-time parking data as well as predicted parking data. The relationship between the current, real-time parking data and the forecasted parking data may be based on the inputs and factors of the previously described algorithms. For example, status information card 715 shows a current occupancy of a parking area at 46%. At the bottom of that status information card 715, a "1%" and downward arrow are displayed to indicate that the current occupancy is down 1% from a previous period, such as the same time the previous day. Similarly, status information card 516 shows the current turnover of the parking area at 57 so far for the day, and down three from a previous period. Status information card 717 similarly shows a reserved occupancy (i.e., the number of reserved spaces occupied) currently at 73%, which is up 26% from a previous period.

The dashboard 700 also shows a number of notification cards 720-724. Notification cards may include weather, event, and traffic information that is pertinent to implementing algorithms of the present disclosure. It is contemplated that visual displays of these algorithmic factors may help parking operators intuitively understand the underlying reasons for the predictions. For example, an impact event notification card 720 shows that there are 21 "impact events." These events could include, for example, nearby sporting events, concerts, conventions, meetings, or other events that could impact the demand for parking that day. The information that generates these impact events may be provided through one or more commercially available event information APIs.

A violations notification card 721 shows that there are currently 16 violations, which may allow the parking operator to issue citations immediately. A benefit to providing violation notifications to parking operators through this dashboard is that parking operators may be confident in their ability to issue citations that are both accurate and timely. The violation notifications are provided in substantially real time; that is, the violation appears on the dashboard 700 as soon as occupancy data can be sent from a parking sensor, compared to payment data at the cloud service, and relayed to the parking operator dashboard. For example, if a sensor sends occupancy data that a space is still occupied while the cloud service shows that the payment period has expired, the parking operator can be confident that a citation would be accurate. Further, the parking operator could issue this citation immediately. It is contemplated that in embodiments of this disclosure, the system may work with third party services that may deliver citations electronically or by mail, rather than by a human parking officer physically placing a citation on a car.

A weather notification card 722 shows that there is one weather notification, which may also be factored into various predictive algorithms of the present disclosure. Weather information may also be provided by an API to one or more commercially available weather services used by websites and mobile devices. As described previously, weather information can be used to predict whether parking spaces will be in more or less demand based on previous weather information, other historical data collected, and the implementation of algorithms of the present disclosure. The notification cards also include a business goals card 723 and a surge pricing goals card 724. These notification cards may be clicked on to reveal more detailed information about each kind of notification, as will be described and illustrated later in this disclosure.

Figure 8:
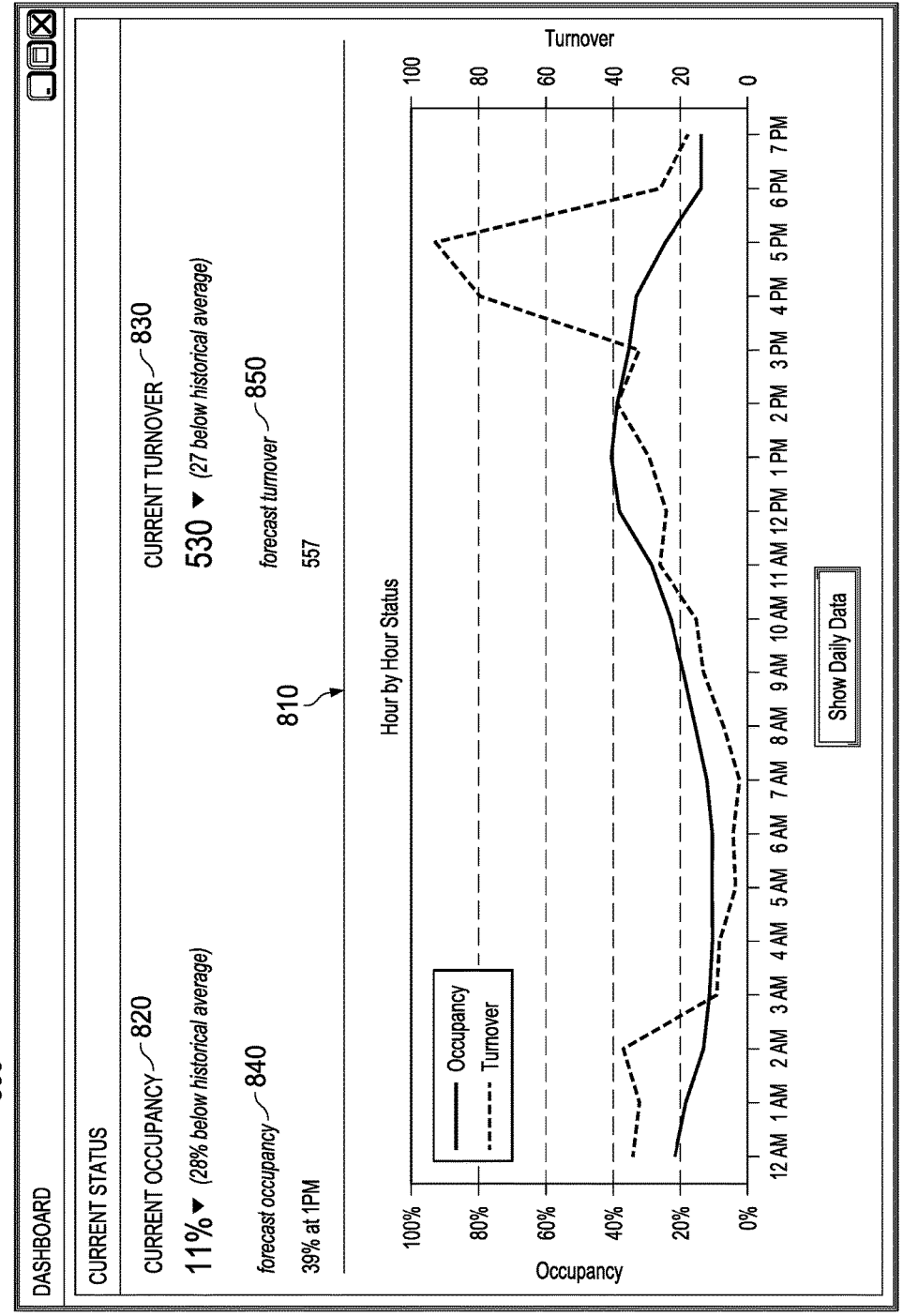
FIG. 8 shows a graphical user interface with an exemplary overview display version of a parking operator dashboard of the present disclosure.

An aspect of the present disclosure is that aggregated parking data may be displayed in a number of different ways in order to make the information optimally useful to a particular parking operator. A parking operator may choose from a number of different ways to view the data that is most relevant to the parking operator's business. FIG. 8 shows a line graph view of the dashboard 800. In this display view, occupancy and turnover are shown on a line graph 810 on an hour-by-hour basis for a particular day. Simultaneously, current occupancy 820 and current turnover 830 are shown as percentage and numerical values, respectively, at the top of the dashboard. Forecast occupancy 840 and forecast turnover 850 are shown just below current occupancy 820 and current turnover 830. This view contains the same or similar information as the informational cards shown in FIG. 7, but in a different visual format.

Several parts of the dashboards 700, 800 may be clicked on to view more detailed information, or information displayed in a differently organized way. In some embodiments, an operator may choose to display certain kinds information instead of others, and may even choose to display different kinds of information for different parking areas. The displayable information available to a parking operator may include a percentage of spot occupancy, a turnover rate, current pricing information, parking violations, weather, traffic, and event alerts, and other pertinent information.

Figure 9:
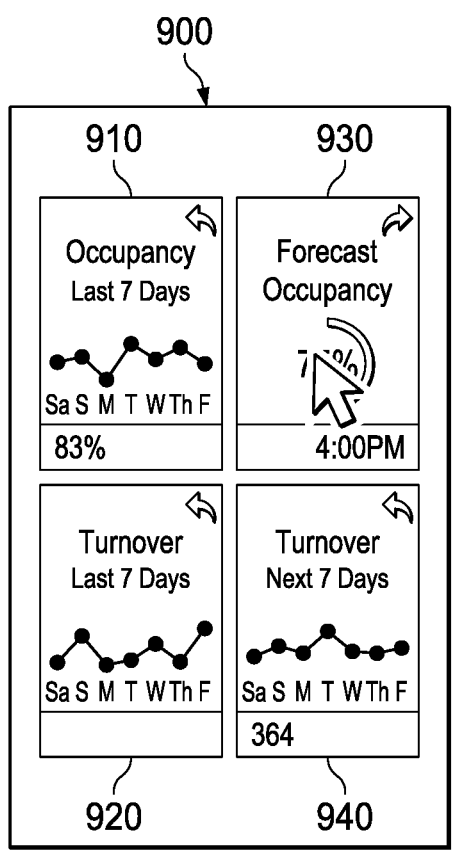
FIG. 9 shows a graphical user interface with an exemplary display of historical and predicted occupancy and turnover.

The dashboard may also include several types of analytics and graphical displays thereof. The graphical displays illustrated in the figures are exemplary only; the information described may be displayed in any number of ways without departing from the present disclosure. The analytics sections may include more detailed information about individual spots, trends, times, and other useful information, and may be displayed in various ways in order to facilitate the usage of the data by the parking operator. A few examples of graphical displays of analytics are shown in FIG. 9. For example, FIG. 9 shows a set of status information cards 900.

In the top left corner, a historical view of occupancy card 910 is shown as a line graph over the past 7 days and a percentage (83%) of occupancy over that time. Similarly, on the bottom left corner, a historical view of turnover card 920 shows a line graph of turnover over the past 7 days. The top right corner shows the "front" of a forecast occupancy card 930 (similar to views of status information cards in FIG. 7). When clicked, it may display a forecast of occupancy over the next 7 days. The bottom right corner shows a forecast turnover card 940, which shows a line graph of forecasted turnover over for the next 7 days. The forecast occupancy and turnover data shown are outputs of the algorithms of the present disclosure.

Figure 10:
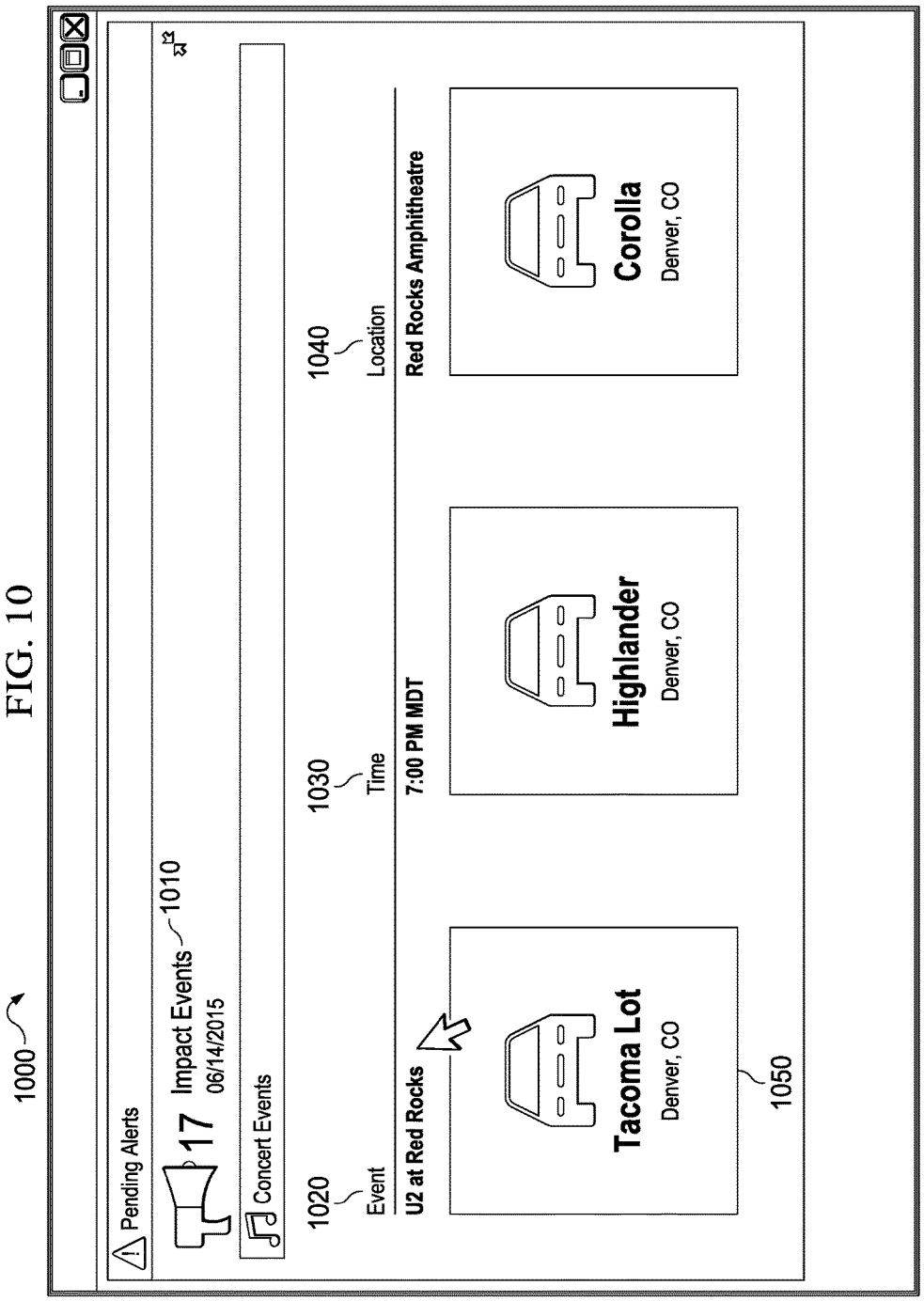
FIG. 10 shows a graphical user interface with an exemplary display of details of impact events that may be used to predict occupancy and turnover.

FIG. 10 shows an display of additional information that may be visible on the parking operator dashboard when a notification card regarding impact events is clicked. An impact events display 1000 may show a number of total impact events 1010. In the present example, 17 impact events are shown, which may be the number of upcoming events over a given time period such as a week. The impact events display 1000 may show an event name 1020, an event time 1030, and an event location 1040. The display 1000 may also show one or more particular lots 1050. In the example shown, the particular event, because of its location 1040, is likely to be close enough to impact the three lots shown. A parking operator may then click on each individual lot in order to view predictions for that lot.

Another benefit of the system of the present disclosure if that a parking operator may view spot-level detail for highly specific information. FIGS. 11 and 12 show spot-by-spot spreadsheets 1100, 1200 with real-time and historical occupancy information, turnover information, and other information derived from the parking sensors and algorithms. FIGS. 11 and 12 show a length of current stay for occupied spots, the average stay of vehicles in that spot for the day, and whether the vehicle has committed a parking violation. FIG. 12 shows the data of FIG. 11 in a format sorted by a particular criteria. In the example in FIG. 12, the data is sorted by which spots have violations. Parking operators may sort by any of the categories of data in order to gain insight into problems and opportunities that the operator might not otherwise recognize. For example, if certain spots are nearly always empty, even when the lot is almost full, the parking operator can investigate to see whether the spot is hard for customers to access.

Figure 13:
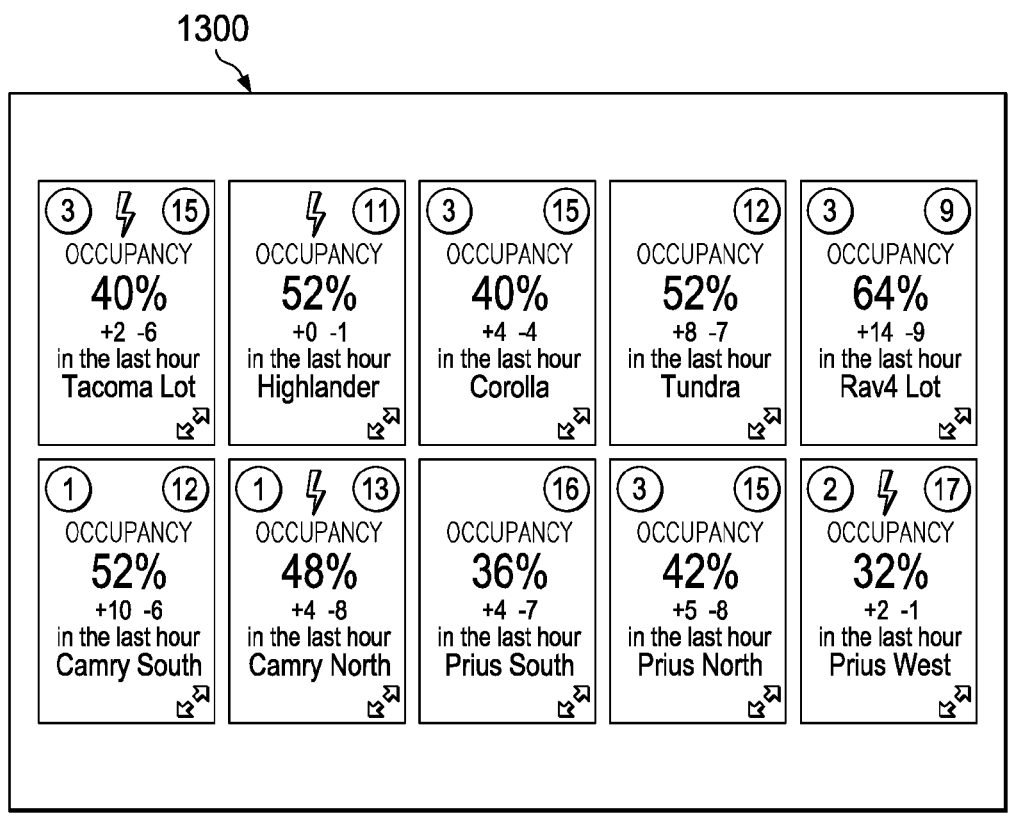
FIG. 13 shows a graphical user interface with an exemplary display that allows a parking operator to view information for multiple parking areas and select a lot to view more detailed information.

FIG. 13 shows yet another graphical interface 1300 that displays high-level occupancy and turnover data on individual cards for multiple lots. Each of the cards may be clicked on to view predictive information or other details for that particular lot.

Figure 14:
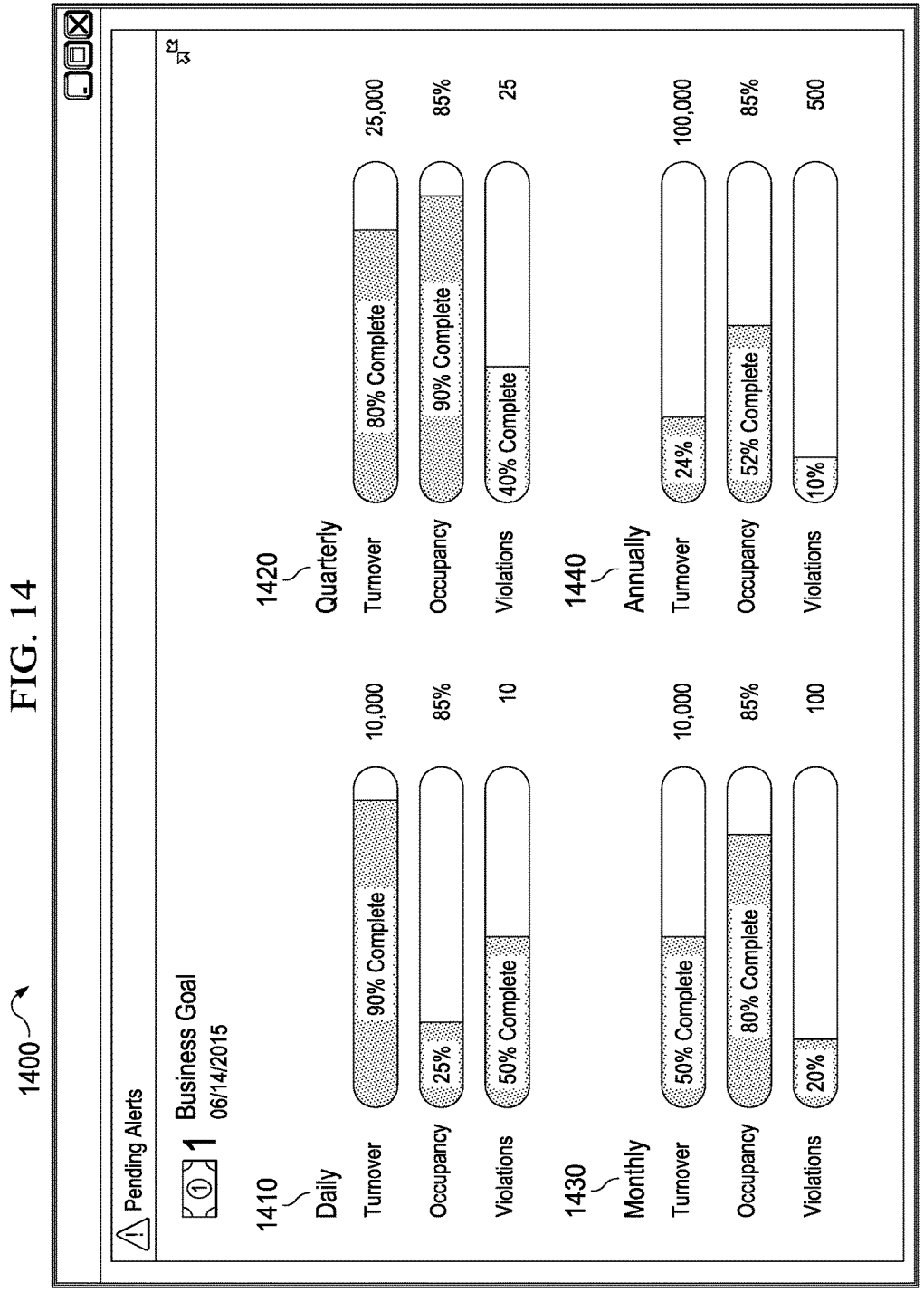
FIG. 14 shows a graphical user interface with an exemplary display comparing a parking operator's business goals to actual performance metrics gathered by parking sensors of the present disclosure.

FIG. 14 shows a detailed view of business goals 1400 that may be displayed to a parking operator by clicking on a business goals notification card as shown in FIG. 7. A parking operator may set goals for turnover, occupancy, and violations over time. Once these goals are selected, the detailed view 1400 may show the operator's progress towards goals on a daily 1410, monthly 1430, quarterly 1420, and annual 1440 basis.

Figure 15:
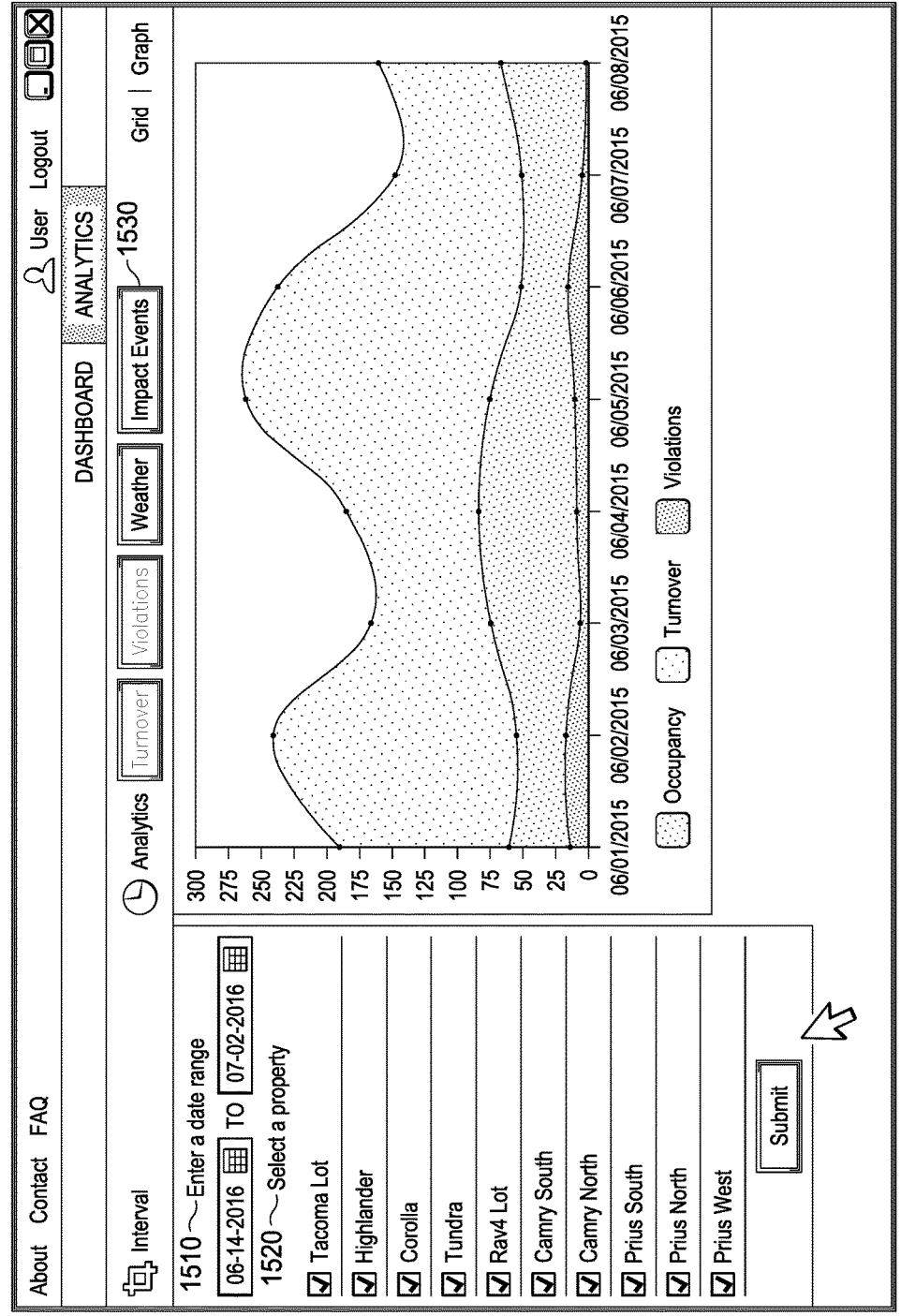
FIG. 15 shows a graphical user interface with an exemplary display that allows a parking operator to select a date range and view customized parking data.

FIG. 15 illustrates an analytics display 1500 that shows even more ways a parking operator can view data collected by the system. As shown, a parking operator can select a date range 1510, select a property 1520, and sort by a number of additional criteria 1530. The parking operator can then see the selected data in a line graph. The views shown in each of the figures herein are just a few examples of the ways operators may view and analyze all the information available through the system of the present disclosure. Many more functions and views are contemplated. Each of the displays may provide the advantage of making it easier to understand and take action on the vast amount of information collected by the system. For example, recommended surge pricing has previously been discussed as an output of the algorithm. But additionally, because an operator may be able to view detail about each particular lot in so many different ways, an operator can experiment with their own pricing increases or decrease and assess the impact on business. For example, a parking operator may be able to experiment with pricing by making parking $3 per hour during the day on a Tuesday, and then the next week making it $2.50 per hour during the same times the next Tuesday to see if his occupancy increases significantly enough to justify the price drop. An operator may be able to view the rate of parking violations and the revenue derived from them. An operator may be able to compare the performance of each of his or her own lots to each other, or to a competitor's lots.

The parking operator dashboard 150 may perform all of the functions described herein, as well as many other functions that may be facilitated by the aggregation of real-time information gathered for each parking spot owned by a parking operator. Because so much data is available to a parking operator, many of the most useful features of the dashboard may relate to how pieces of data are applied to the algorithms and subsequently displayed. Further, the degree to which a parking operator can view, select, and customize the particular data he or she wants to see may be an especially advantageous aspect of this disclosure. In embodiments of the disclosure, parking operators can see how parking structures perform against each another, how individual spots perform against each other, and how current and forecasted weather, price, time of day, month of the year, current and past traffic conditions, special events impact performance, and school schedules, just to name a few examples.

Figure 16:
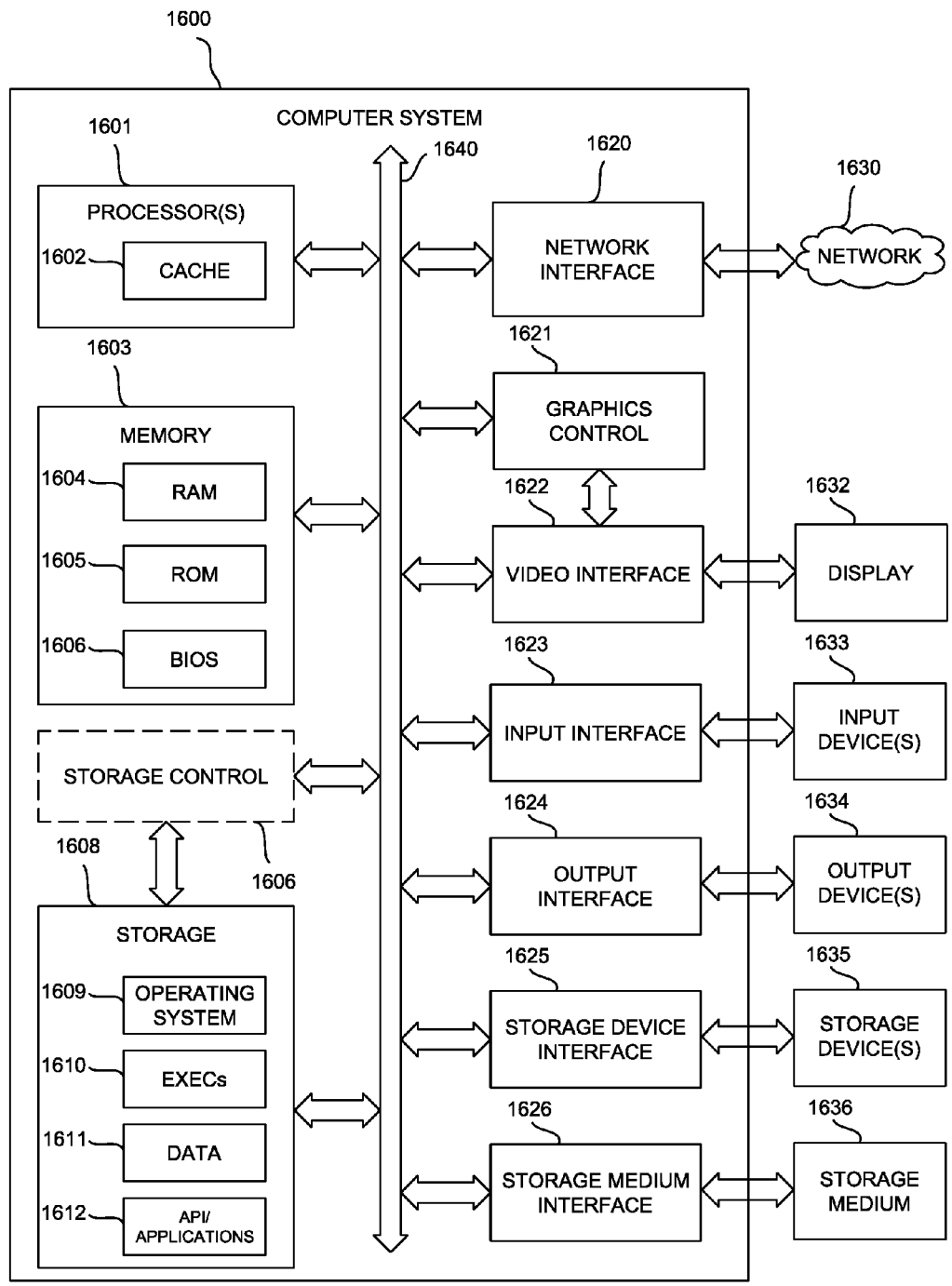
FIG. 16 shows a logical block diagram of a computing system that may implement aspects of the present disclosure.

Referring next to FIG. 16, it is a block diagram depicting an exemplary machine that includes a computer system 1600 within which a set of instructions can execute for causing a device to perform or execute any one or more of the aspects and/or methodologies for static code scheduling of the present disclosure. The components in FIG. 16 are examples only and do not limit the scope of use or functionality of any hardware, software, embedded logic component, or a combination of two or more such components implementing particular embodiments. The computer system 1600 may be used to implement one or more of the cloud service 130, the parking operator dashboard 150, the administration 140, and the gateway 120.

Computer system 1600 may include a processor 1601, a memory 1603, and a storage 1608 that communicate with each other, and with other components, via a bus 1640. The bus 1640 may also link a display 1632, one or more input devices 1633 (which may, for example, include a keypad, a keyboard, a mouse, a stylus, etc.), one or more output devices 1634, one or more storage devices 1635, and various tangible storage media 1636. All of these elements may interface directly or via one or more interfaces or adaptors to the bus 1640. For instance, the various tangible storage media 1636 can interface with the bus 1640 via storage medium interface 1626. Computer system 1600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1601 (or central processing unit(s) (CPU(s))) optionally contains a cache memory unit 1602 for temporary local storage of instructions, data, or computer addresses. Processor(s) 1601 are configured to assist in execution of computer readable instructions. Computer system 1600 may provide functionality for the components depicted in FIG. 1 as a result of the processor(s) 1601 executing non-transitory, processor-executable instructions embodied in one or more tangible computer-readable storage media, such as memory 1603, storage 1608, storage devices 1635, and/or storage medium 1636. The computer-readable media may store software that implements particular embodiments, and processor(s) 1601 may execute the software. Memory 1603 may read the software from one or more other computer-readable media (such as mass storage device(s) 1635, 1636) or from one or more other sources through a suitable interface, such as network interface 1620. The software may cause processor(s) 1601 to carry out one or more processes or one or more steps of one or more processes described or illustrated herein. Carrying out such processes or steps may include defining data structures stored in memory 1603 and modifying the data structures as directed by the software.

The memory 1603 may include various components (e.g., machine readable media) including, but not limited to, a random access memory component (e.g., RAM 1604) (e.g., a static RAM "SRAM", a dynamic RAM "DRAM, etc.), a read-only component (e.g., ROM 1605), and any combinations thereof. ROM 1605 may act to communicate data and instructions unidirectionally to processor(s) 1601, and RAM 1604 may act to communicate data and instructions bidirectionally with processor(s) 1601. ROM 1605 and RAM 1604 may include any suitable tangible computer-readable media described below. In one example, a basic input/output system 1606 (BIOS), including basic routines that help to transfer information between elements within computer system 1600, such as during start-up, may be stored in the memory 1603.

Fixed storage 1608 is connected bidirectionally to processor(s) 1601, optionally through storage control unit 1607. Fixed storage 1608 provides additional data storage capacity and may also include any suitable tangible computer-readable media described herein. Storage 1608 may be used to store operating system 1609, EXECs 1610 (executables), data 1611, API applications 1612 (application programs), and the like. Often, although not always, storage 1608 is a secondary storage medium (such as a hard disk) that is slower than primary storage (e.g., memory 1603). Storage 1608 can also include an optical disk drive, a solid-state memory device (e.g., flash-based systems), or a combination of any of the above. Information in storage 1608 may, in appropriate cases, be incorporated as virtual memory in memory 1603.

In one example, storage device(s) 1635 may be removably interfaced with computer system 1600 (e.g., via an external port connector (not shown)) via a storage device interface 1625. Particularly, storage device(s) 1635 and an associated machine-readable medium may provide nonvolatile and/or volatile storage of machine-readable instructions, data structures, program modules, and/or other data for the computer system 1600. In one example, software may reside, completely or partially, within a machine-readable medium on storage device(s) 1635. In another example, software may reside, completely or partially, within processor(s) 1601.

Bus 1640 connects a wide variety of subsystems. Herein, reference to a bus may encompass one or more digital signal lines serving a common function, where appropriate. Bus 1640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1600 may also include an input device 1633. In one example, a user of computer system 1600 may enter commands and/or other information into computer system 1600 via input device(s) 1633. Examples of an input device(s) 1633 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1633 may be interfaced to bus 1640 via any of a variety of input interfaces 1623 (e.g., input interface 1623) including, but not limited to, serial, parallel, game port, USB, FIREWIRE, THUNDERBOLT, or any combination of the above.

In particular embodiments, when computer system 1600 is connected to network 1630, computer system 1600 may communicate with other devices, specifically mobile devices and enterprise systems, connected to network 1630. Communications to and from computer system 1600 may be sent through network interface 1620. For example, network interface 1620 may receive incoming communications (such as requests or responses from other devices) in the form of one or more packets (such as Internet Protocol (IP) packets) from network 1630, and computer system 1600 may store the incoming communications in memory 1603 for processing. Computer system 1600 may similarly store outgoing communications (such as requests or responses to other devices) in the form of one or more packets in memory 1603 and communicated to network 1630 from network interface 1620. Processor(s) 1601 may access these communication packets stored in memory 1603 for processing.

Examples of the network interface 1620 include, but are not limited to, a network interface card, a modem, and any combination thereof. Examples of a network 1630 or network segment 1630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1630, may employ a wired and/or a wireless mode of communication. In general, any network topology may be used.

Information and data can be displayed through a display 1632. Examples of a display 1632 include, but are not limited to, a liquid crystal display (LCD), an organic liquid crystal display (OLED), a cathode ray tube (CRT), a plasma display, and any combinations thereof. The display 1632 can interface to the processor(s) 1601, memory 1603, and fixed storage 1608, as well as other devices, such as input device(s) 1633, via the bus 1640. The display 1632 is linked to the bus 1640 via a video interface 1622, and transport of data between the display 1632 and the bus 1640 can be controlled via the graphics control 1621.

In addition to a display 1632, computer system 1600 may include one or more other peripheral output devices 1634 including, but not limited to, an audio speaker, a printer, and any combinations thereof. Such peripheral output devices may be connected to the bus 1640 via an output interface 1624. Examples of an output interface 1624 include, but are not limited to, a serial port, a parallel connection, a USB port, a FIREWIRE port, a THUNDERBOLT port, and any combinations thereof.

In addition or as an alternative, computer system 1600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for parking data collection and aggregation comprising:
   a plurality of parking sensors, wherein:
      each parking sensor of the plurality of parking sensors is located within a parking spot;
      each parking sensor of the plurality of parking sensors comprises a low-power radio transceiver, a processor, and a sensor for detecting a presence of a vehicle within the parking spot in which the parking sensor is located; and
      the processor of each parking sensor of the plurality of parking sensors is configured to:
         activate the low-power radio transceiver in response to the parking sensor detecting the vehicle within the parking spot in which the parking sensor is located;
         scan for a consumer's personal communication device using the low-power radio transceiver; and
         transmit, via the low-power radio transceiver, a parking spot identifier directly to the consumer's personal communication device;
   one or more gateway devices in communication with the plurality of parking sensors;
   an administrator interface;
   a parking operator dashboard interface;
   a cloud service component, wherein the cloud service component receives parking sensor data indicating occupancy and turnover from the one or more gateway devices and transmits the parking sensor data to the parking operator dashboard interface, and
   the cloud service component comprising:
      a database for storing the parking sensor data, and
      a software application for implementing an algorithm that compares the parking sensor data for a past time period to one or more external factors to create one or more predictions for future occupancy and future turnover during a future time period;
   wherein the parking operator dashboard interface displays:
      one or more representations of the parking sensor data over the past time period, and
      the one or more predictions for future occupancy and future turnover of the algorithm.

2. The system of claim 1, wherein the external factors comprise one or more of:
   a time of day;
   a day of a week,
   a calendar date;
   weather information;
   notification of an event taking place near a parking area;
   traffic information; and
   business goals of a parking operator.

3. The system of claim 1, wherein the external factors comprise all of:
   a time of day;
   a day of a week,
   a calendar date;
   weather information;
   notification of an event taking place near a parking area;
   traffic information; and
   business goals of a parking operator.

4. The system of claim 1, wherein the plurality of parking sensors communicate with the one or more gateway devices via a one-way wireless communication protocol in which the plurality of parking sensors sends the parking sensor data to the one or more gateway devices and the one or more gateway devices sends an acknowledgement packet back to the plurality of parking sensors, wherein the one or more gateway devices are further configured to:
   add instructional information for the plurality of parking sensors to the acknowledgement packet.

5. The system of claim 4, wherein the instructional information comprises a direction to change a communication channel.

6. The system of claim 1, wherein the sensors of the plurality of parking sensors are magnetometers, and wherein the system is configured to remotely calibrate the magnetometers through the cloud service component and one or more of the gateway devices based on a geolocation of each of the plurality of parking sensors.

7. The system of claim 6, wherein the cloud service component remotely calibrates the magnetometers automatically once the plurality of parking sensors are installed in a parking area.

8. The system of claim 1, wherein the plurality of parking sensors each comprise a microprocessor, a vehicle detection sensor, and a transceiver, and each of the plurality of parking sensors are configured to transmit a first set of information at regular intervals to one of the one or more gateway devices.

9. The system of claim 8, wherein the first set of information for a particular parking sensor comprises one or more of:
   a unique parking sensor ID;
   a system status of the particular parking sensor indicating whether the particular parking sensor is operational; and
   whether a parking spot in which the particular parking sensor is located is occupied.

10. The system of claim 8, wherein at least one of the plurality of parking sensors is configured to transmit its first set of information at a staggered time interval from at least one other of the plurality of parking sensors.

11. The system of claim 8, wherein the plurality of parking sensors are further configured to transmit a second set of information at regular intervals.

12. The system of claim 11, wherein the second set of information comprises one or more of:
   battery voltage;
   raw magnetometer data;

a temperature of the particular parking sensor;
BLE radio information;
link quality measurements; and
error rates.

13. The system of claim 8, wherein the transceiver is turned off when it is not transmitting any information.

14. A method for providing predictive parking data, the method comprising:
   activating a low-power radio transceiver of a parking sensor in response to a sensor detecting a vehicle within a parking spot in which the parking sensor is located;
   scanning for a consumer's personal communication device using the low-power radio transceiver; and
   transmitting, via the low-power radio transceiver, a parking spot identifier directly to the consumer's personal communication device;
   collecting occupancy and turnover for a plurality of parking spots using data from the parking sensor;
   receiving information about one or more external factors from one or more application program interfaces;
   comparing the occupancy and turnover data for a past time period to the one or more external factors to create one or more predictions for future occupancy and future turnover during a future time period; and
   displaying the one or more predictions for future occupancy and future turnover on a graphical user interface.

15. The method of claim 14, wherein the external factors comprise one or more of:
   a time of day;
      a day of a week,
      a calendar date;
      weather information;
      notification of an event taking place near a parking area;
      traffic information; and
      business goals of a parking operator.

16. The method of claim 14, wherein the external factors comprise all of:
   a time of day;
   a day of a week,
   a calendar date;
   weather information;
   notification of an event taking place near a parking area;
   traffic information; and
   business goals of a parking operator.

17. The method of claim 14, further comprising:
   storing, at a database, the occupancy and turnover data for a past time period; and
   categorizing the occupancy and turnover data by a time of day, a day of a week, a calendar date, a month, and a year.

18. The method of claim 14, wherein the method further comprises:
   displaying a recommendation of increased pricing for the future time period based on the one or more predictions for future occupancy.

19. The method of claim 18, further comprising:
   automatically implementing the recommendation of increased pricing.

20. The method of claim 14, further comprising:
   displaying a comparison of business goals of a parking operator to the occupancy and turnover data for a past time period.

* * * * *